(12) United States Patent
Harris et al.

(10) Patent No.: US 6,323,974 B1
(45) Date of Patent: Nov. 27, 2001

(54) OPTICAL PROTECTION SYSTEM FOR LIQUID CRYSTAL SWITCHES

(75) Inventors: J. Michael Harris, Elmira, NY (US); David F. Gahan, East Henney (GB)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/491,052

(22) Filed: Jan. 25, 2000

(51) Int. Cl.[7] ................................. H04B 10/08
(52) U.S. Cl. ................ 359/110; 359/117; 359/128; 385/16; 385/18
(58) Field of Search ................ 359/110, 117, 359/128; 385/16, 18

(56) References Cited

U.S. PATENT DOCUMENTS

| | | | |
|---|---|---|---|
| 5,003,531 | * 3/1991 | Farinholt | 370/223 |
| 5,050,164 | * 9/1991 | Chao et al. | 359/135 |
| 5,327,275 | * 7/1994 | Yamane et al. | 359/117 |
| 5,510,917 | * 4/1996 | Corke et al. | 359/110 |
| 5,594,581 | * 1/1997 | Alphonsus | 359/117 |
| 5,631,896 | * 5/1997 | Kawase et al. | 370/228 |
| 5,838,924 | * 11/1998 | Anderson et al. | 395/200.69 |
| 5,889,610 | * 3/1999 | Fatehi et al. | 359/341 |
| 6,075,629 | 6/2000 | Al-Salameh et al. . | |

* cited by examiner

*Primary Examiner*—Leslie Pascal
*Assistant Examiner*—Chau M. Nguyen
(74) *Attorney, Agent, or Firm*—Juliana Agon

(57) ABSTRACT

An optical device protection system provides dedicated and shared protection for a plurality of optical working devices which may include four-port optical working devices. The system includes an optical switch structure for routing an optical signal around an optical device when the optical device exhibits an error condition. A protection optical device performs a desired operation on the optical signal, wherein the optical switch structure directs the optical signal through the protection optical device. The use of liquid crystal switches allows the optical switch structure to sense an incorrect capacitance value associated with the liquid crystal switch. A control signal is then generated in response to the incorrect capacitance value. Thus, the optical device protection system provides flexibility and a low cost method for protecting complex optical devices.

25 Claims, 9 Drawing Sheets

OPTICAL PROTECTION SYSTEM FOR LIQUID CRYSTAL SWITCHES

BACKGROUND OF THE INVENTION

1. Field of the Invention

The present invention relates generally to the protection of optical devices. More particularly, the present invention is directed to the protection of liquid crystal switches in optical networking elements.

2. Technical Background

A principal interest of communications technologies is enhancing networking ability. The primary goals behind each form of communication developed over the years were the improvement of transmission fidelity, the increase of data rates, and the increase of distance between relay stations. The speed at which light travels and its potential to address all of these concerns logically led to attempts at optical communication. Early experiments with optical communication suggested the feasibility of modulating a coherent optical carrier wave at very high frequencies, but were commercially impractical because of the installation expense and the tremendous cost of developing the necessary components. The combination of semiconductor technology, which provided the necessary light sources and photodetectors, and optical waveguide technology, however, eventually enabled the development and application of optical fiber-based systems despite these initially perceived difficulties.

In the recent rapid development of optical transmissions, networking has become commonplace and networking architectures have become increasingly complex. Most architectures now provide a large number of client network elements with the ability to both listen and transmit on optical channels within the network. Interconnected ring architectures provide even greater connectivity and complexity by bringing together client network elements of multiple rings. A relatively basic optical network will incorporate terminal multiplexers, add drop multiplexers, optical crossconnect systems, matched nodes, and interconnect nodes.

While certain networking components have been well defined, the design of many of these elements continues to undergo rapid development. Add drop multiplexers and ring interconnect nodes, for example, require optical switching ability and have only recently begun to make use of liquid crystal switches. A liquid crystal switch (LCS) is a switching device that modulates light which is already present. Such a device is presently being marketed by Corning Incorporated, the assignee of the present invention, under the name PurePath™ Wavelength Selective Switch (WSS). While LCS's provide high switching accuracy and are readily adaptable to the increasing complexity of optical networking structures, they are large and very expensive. A substantial complication associated with the use of LCS's in networking architectures is the possibility of device failure.

The use of any large and expensive component within an optical network presents questions of reliability. Essentially, when a working optical component fails, the network architecture must provide the necessary redundancy and switching to eliminate or minimize the potential for loss of communication between client network elements. Conventional approaches have placed a redundant protection LCS in series with a working LCS. There are a number of potential shortcomings, however, associated with this configuration. Such a structure, for example, requires complex coordination between the two switches and a detailed capability to sense the particular fault and its state. It is also important to note that if the defective LCS is partially switched, an effective open circuit is created and the series protection LCS cannot cure the defect. Placing an additional LCS in series also doubles insertion losses. Furthermore, this approach fails to solve the problem of loss of communication during repair of the defective LCS.

Flexibility, cost, and complexity of the protection system are also issues of concern. One-for-one redundancy therefore substantially adds to the cost of LCS systems which are already expensive. Shared protection is therefore highly desirable. Another issue associated with reliability is switching control for the protection device. For example, for a pair of four-port working LCS's it is desirable to detect failures via a mechanism other than detection of optical signal strength, because optical signal strength can be affected by a number of components throughout the network. Reliance on optical signal strength could therefore lead to unnecessary protection switching and inefficient network operation. Accordingly, it is desirable to provide a system and method for protecting optical devices which is not dependent on optical signal strength.

SUMMARY OF THE INVENTION

In accordance with the present invention, an optical device protection system provides protection for optical devices with minimal redundancy and cost. The system includes an optical switch structure for routing an optical signal around an optical device when the optical device exhibits an error condition. A protection optical device performs a desired operation on the optical signal, wherein the optical switch structure directs the optical signal through the protection optical device. In a preferred embodiment, the defective optical device is a liquid crystal switch and the protection optical device is a protection liquid crystal switch, wherein the desired operation includes a switching operation. The use of liquid crystal switches allows error conditions to be defined by an incorrect capacitance value of the defective liquid crystal switch. The protection system of the present invention can be configured to provide dedicated or shared protection to the defective liquid crystal switch.

Further in accordance with the present invention, the optical switch structure includes a control system, an input switch configuration, and an output switch configuration. The control system senses an error condition in a defective optical device, where the control system generates a control signal in response to the error condition. The input switch configuration routes the optical signal from an input path of the defective optical device to a protection optical device based on the control signal. The protection optical device is therefore able to perform a desired operation on the optical signal. The output switch configuration routes the optical signal from the protection optical device to an output path of the defective optical device based on the control signal. In a preferred embodiment the control system senses an incorrect capacitance value of a defective liquid crystal switch.

In another aspect of the invention, a method is provided for protecting a liquid crystal switch. The method includes the step of routing an optical signal around the liquid crystal switch when the liquid crystal switch exhibits an error condition. The optical signal is then directed through a protection liquid crystal switch, and a desired switching operation is performed on the optical signal.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
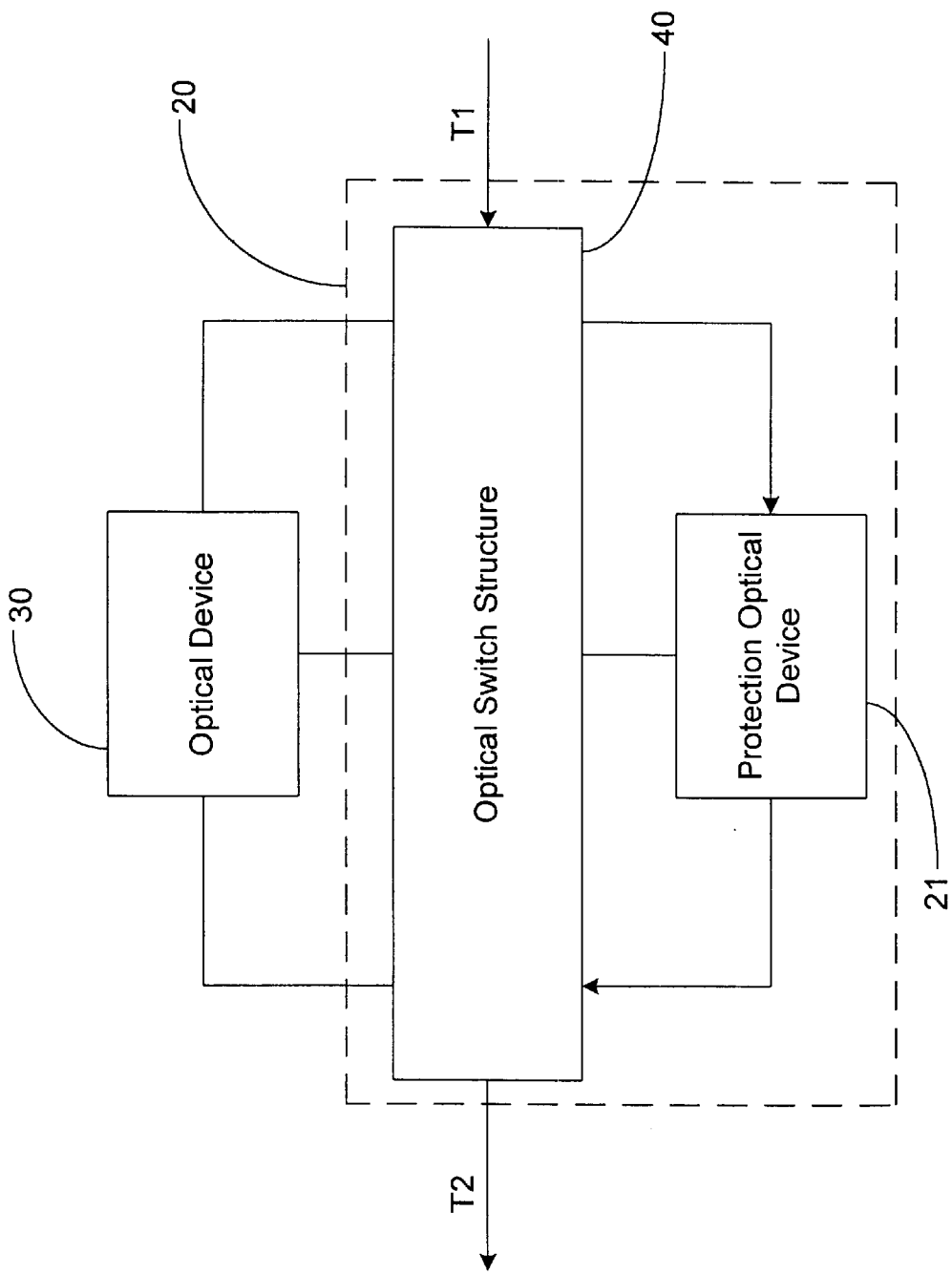
FIG. 1 is a block diagram of an optical device protection system in accordance with the present invention.

Reference will now be made in detail to the present preferred embodiments of the invention, examples of which are illustrated in the accompanying drawings. Wherever possible, the same reference numerals will be used throughout the drawings to refer to the same or like parts.

FIG. 1 shows an optical device protection system 20 for protecting an optical device 30. Protection system 20 includes an optical switch structure 40 and a protection optical device 21. It can be seen that the optical switch structure 40 routes an optical signal T1 around the optical device 30 when the optical device 30 exhibits an error condition. The protection optical device 21 performs a desired operation on the optical signal T1, where the optical switch structure 40 directs the optical signal T1 through the protection optical device 21. The resulting optical signal T2 is routed back to the network as if the defective optical device 30 were fully functional. Preferably, the optical device 30 is a liquid crystal switch (LCS) and the protection optical device 21 is a protection LCS, where the desired operation includes a switching operation.

Figure 2:
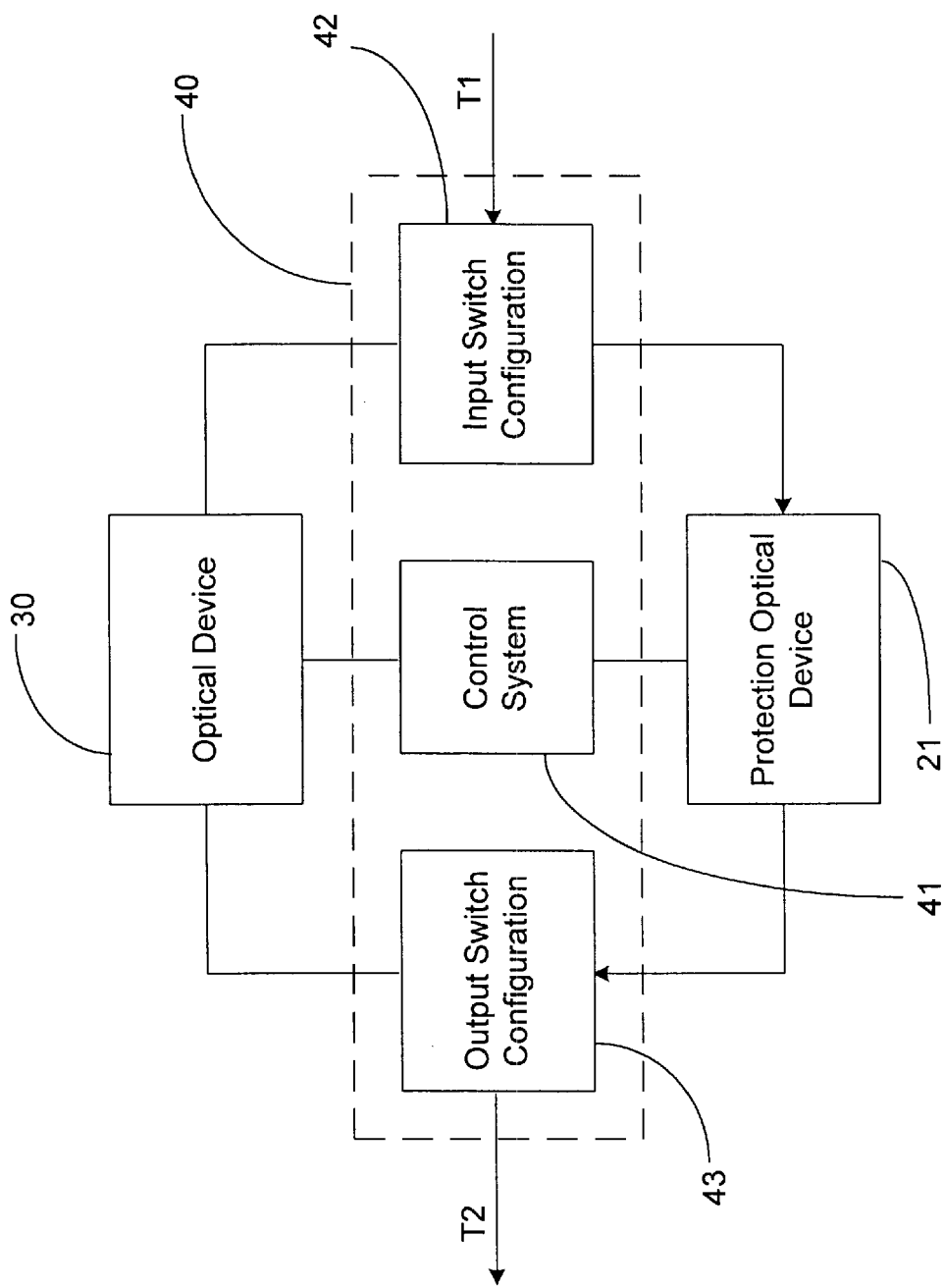
FIG. 2 is a more detailed block diagram of the optical device protection system of FIG. 1.

Turning now to FIG. 2, the optical switch structure 40 is shown in greater detail. Specifically, the optical switch structure 40 includes a control system 41, an input switch configuration 42, and an output switch configuration 43. The control system 41 senses the error condition in the optical device 30 and generates a control signal in response to the error condition. The input switch configuration 42 routes the optical signal T1 from the input path of the defective optical device 30 to the protection optical device 21 based on the control signal. After the protection optical device 21 performs the desired operation, the resulting optical signal is routed from the protection optical device 21 to the output path T2 of the output switch configuration 43 such that defective optical device 30 is bypassed. It will be appreciated that the output switch configuration 43 also operates in response to the control signal generated by the control system 41.

Figure 3:
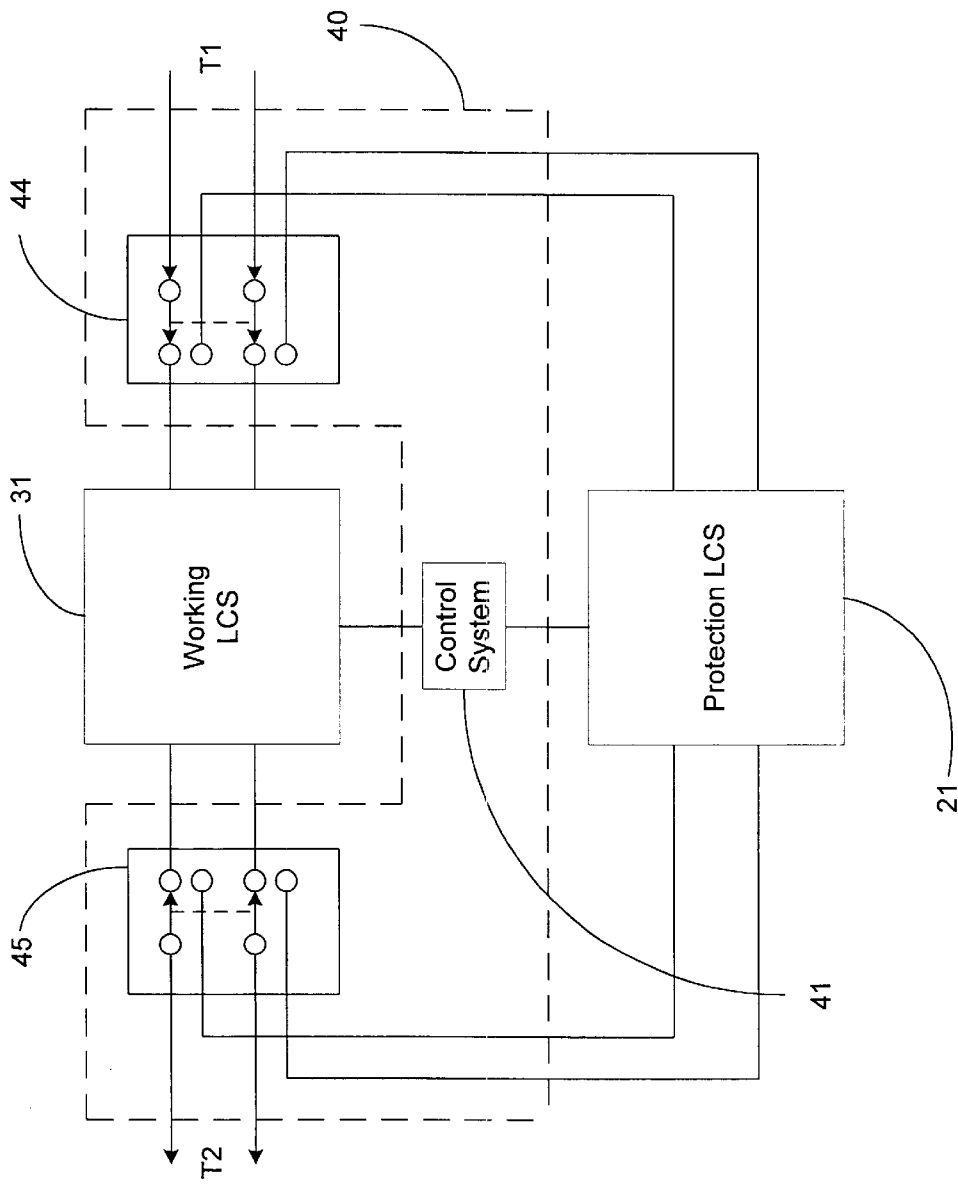
FIG. 3 is a schematic diagram of an optical device protection system providing dedicated protection in accordance with the present invention.
Figure 4:
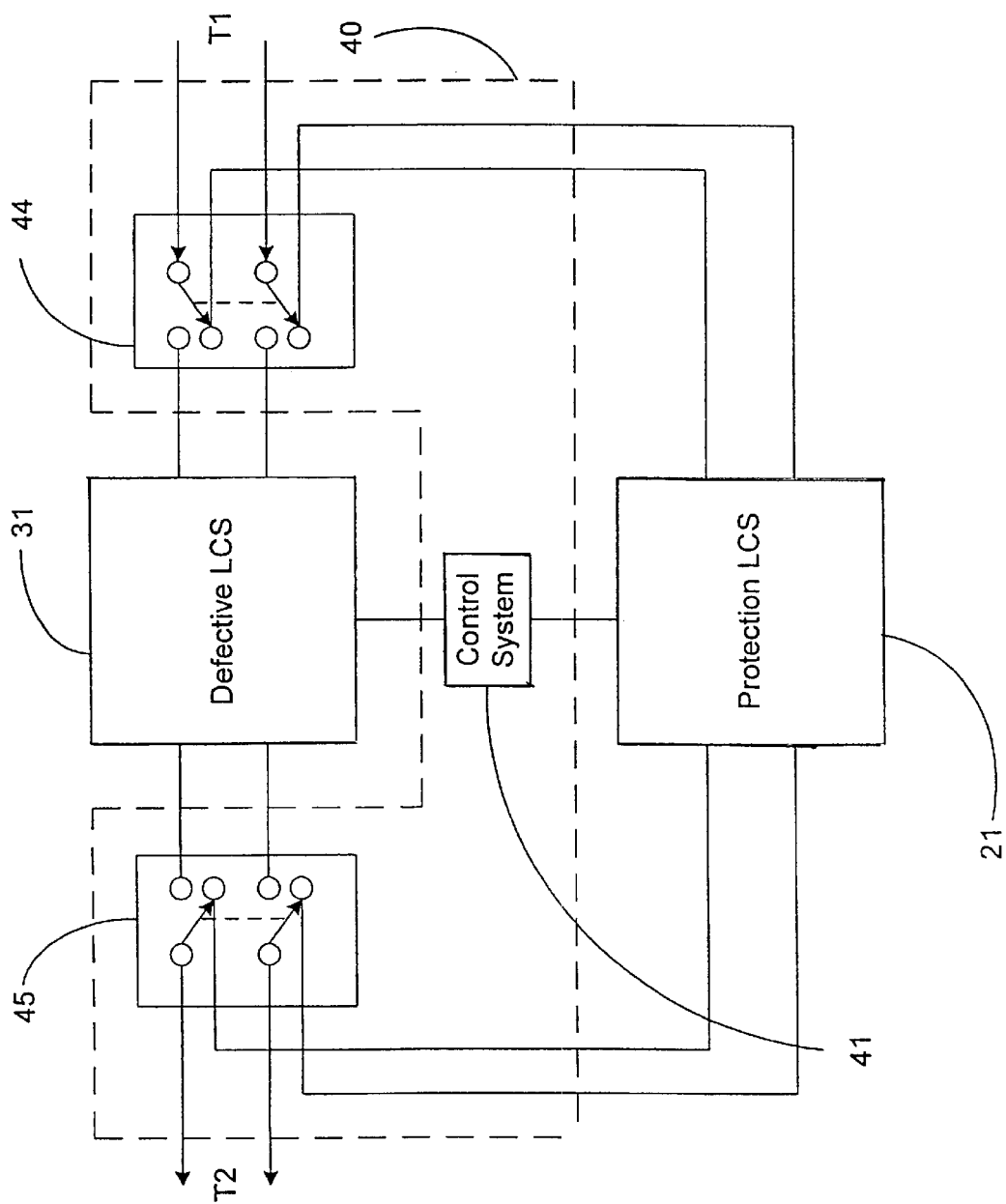
FIG. 4 is a schematic diagram showing the optical device protection system in FIG. 3 with a defective LCS.

It will further be appreciated that the above described optical device protection system 30 can be implemented in either a dedicated protection configuration or a shared protection configuration. A schematic showing implementation of dedicated protection is shown in FIG. 3. Specifically, under normal operating conditions a working LCS 31 receives the optical signal T1 from an input 1×2 optical switch pair 44, performs the desired switching operation, and passes the resulting optical signal T2 to an output 1×2 optical switch pair 45, wherein each switch pair 44, 45 is in a first switched state. FIG. 4 demonstrates operation of the optical switch structure 40 when the control system 41 senses an error condition in defective LCS 31. Preferably, the control system 41 is designed to sense an incorrect capacitance value associated with the defective LCS 31. When this condition occurs, each switch pair 44, 45 is placed into a second switching state for routing the optical signal T1 around the defective LCS 31 and through the protection LCS 21.

Figure 5:
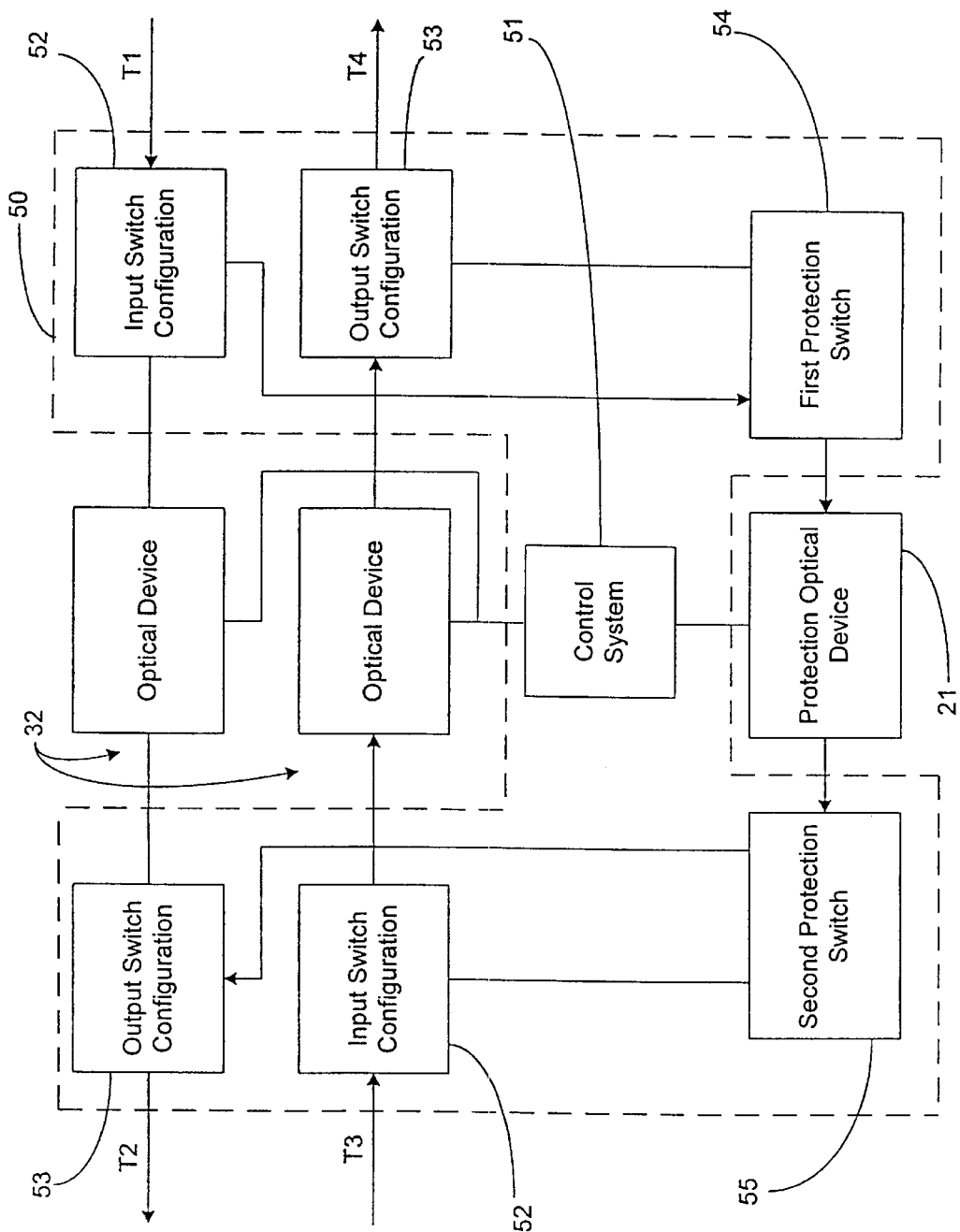
FIG. 5 is a block diagram of an optical device protection system providing shared protection in accordance with a preferred embodiment of the present invention.

Turning now to FIG. 5, it will be appreciated that the optical device protection system of the present invention can be readily configured for shared protection. Thus, optical switch structure 50 must perform the additional function of selecting the defective optical device from a plurality of working optical devices 32. It can be seen that the optical switch structure 50 has a first protection switch 54 and a second protection switch 55 in addition to the control system 51, the input switch configuration 52, and the output switch configuration 53 discussed above. The defective optical device is one of a plurality of working optical devices 32.

Figure 6:
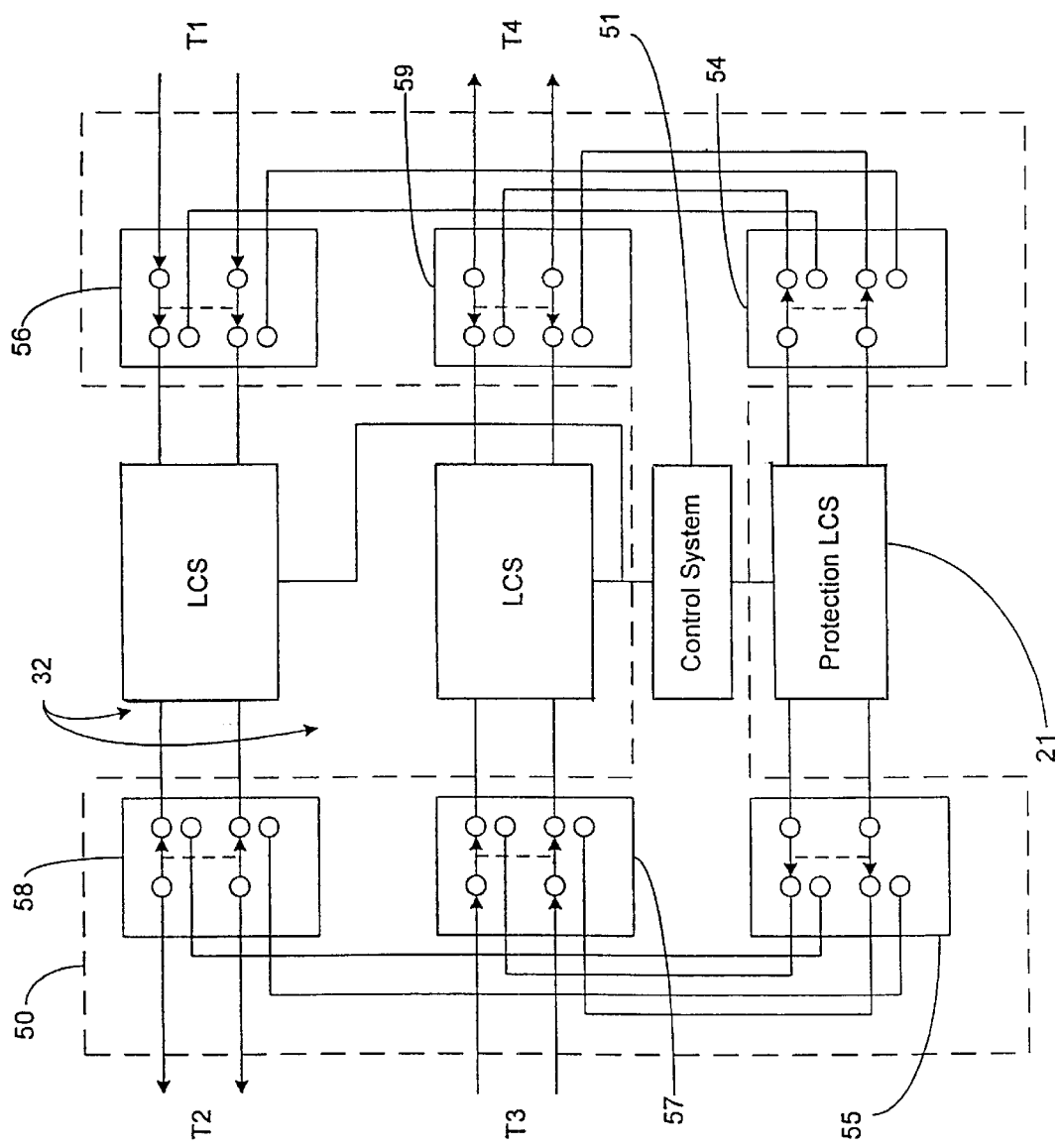
FIG. 6 is a schematic implementation of the optical device protection system shown in FIG. 5.

Turning now to FIG. 6, an implementation of the optical switch structure 50 is shown for shared protection. It can be appreciated that the input switch configuration 52 (FIG. 5) includes a plurality of input switches 56, 57 disposed in input paths of the plurality of working liquid crystal switches 32 for selecting the defective liquid crystal switch from the plurality of working liquid crystal switches 32 based on the control signal from the control system 51. FIG. 6 therefore shows the normal operating condition wherein all of the plurality of working liquid crystal switches 32 are operational and the input switches 56, 57 are in a first switching state. The output switch configuration 53 (FIG. 5) includes a plurality of output switches 58, 59 disposed along output paths of the plurality of working liquid crystal switches 32. The output switches 58, 59 are also shown in a first switching state. The plurality of output switches 58, 59 select the defective LCS from the plurality of working LCS's 32 based on the control signal from the control system 51. While the LCS's shown in FIG. 6 are part of a four fiber bidirectional ring architecture, one skilled in the art will appreciate that the optical device protection system of the present invention can be utilized with a variety of optical network configurations.

With continued reference to FIG. 6, the first protection switch 54 routes the optical signal from the input path of the defective LCS to the protection LCS 21, while the second protection switch 55 routes the optical signal from the protection LCS 21 to the output path of the defective LCS.

Figure 7:
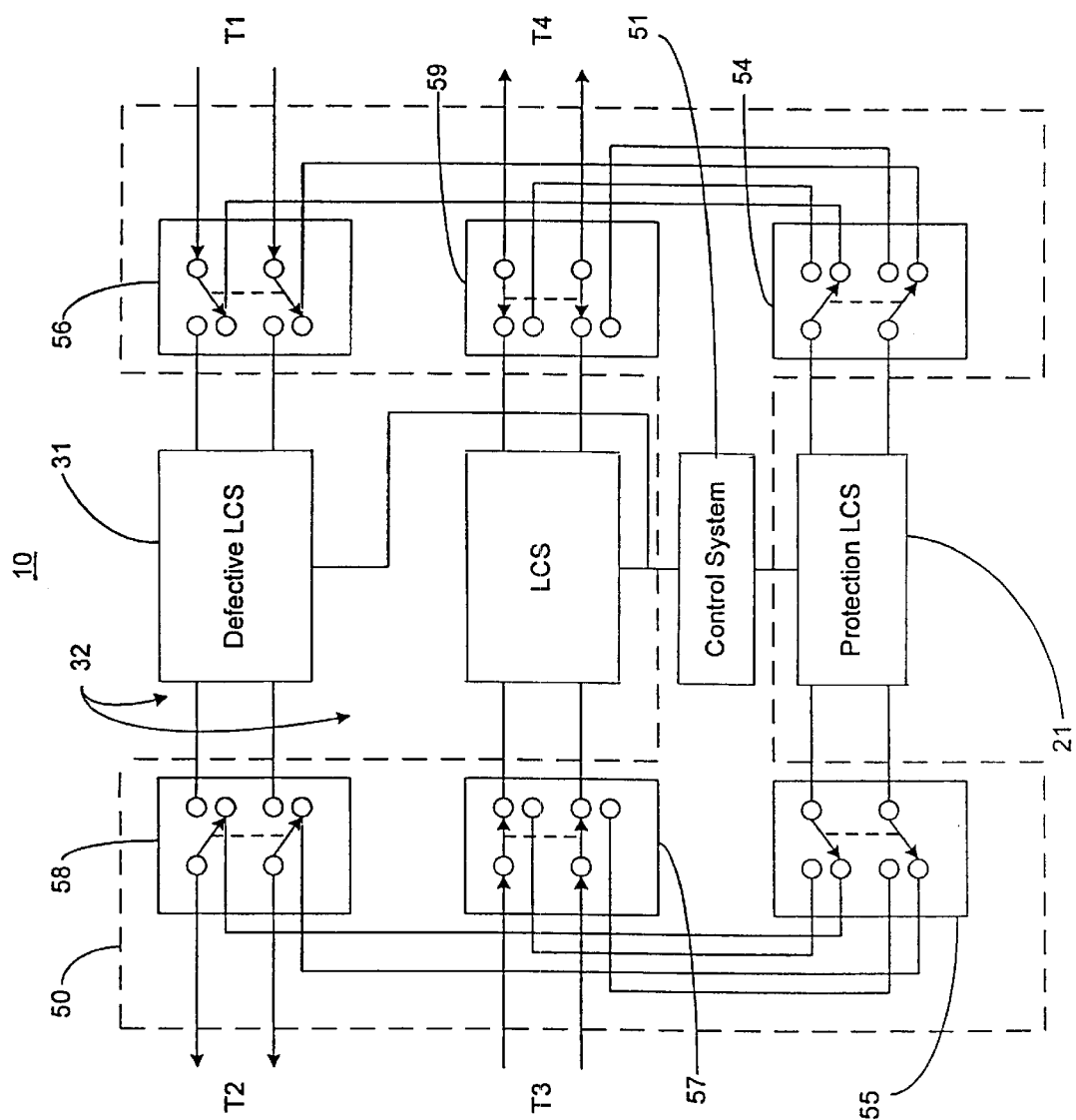
FIG. 7 is a schematic diagram of the optical device protection system of FIG. 6 shown with a defective first LCS.
Figure 8:
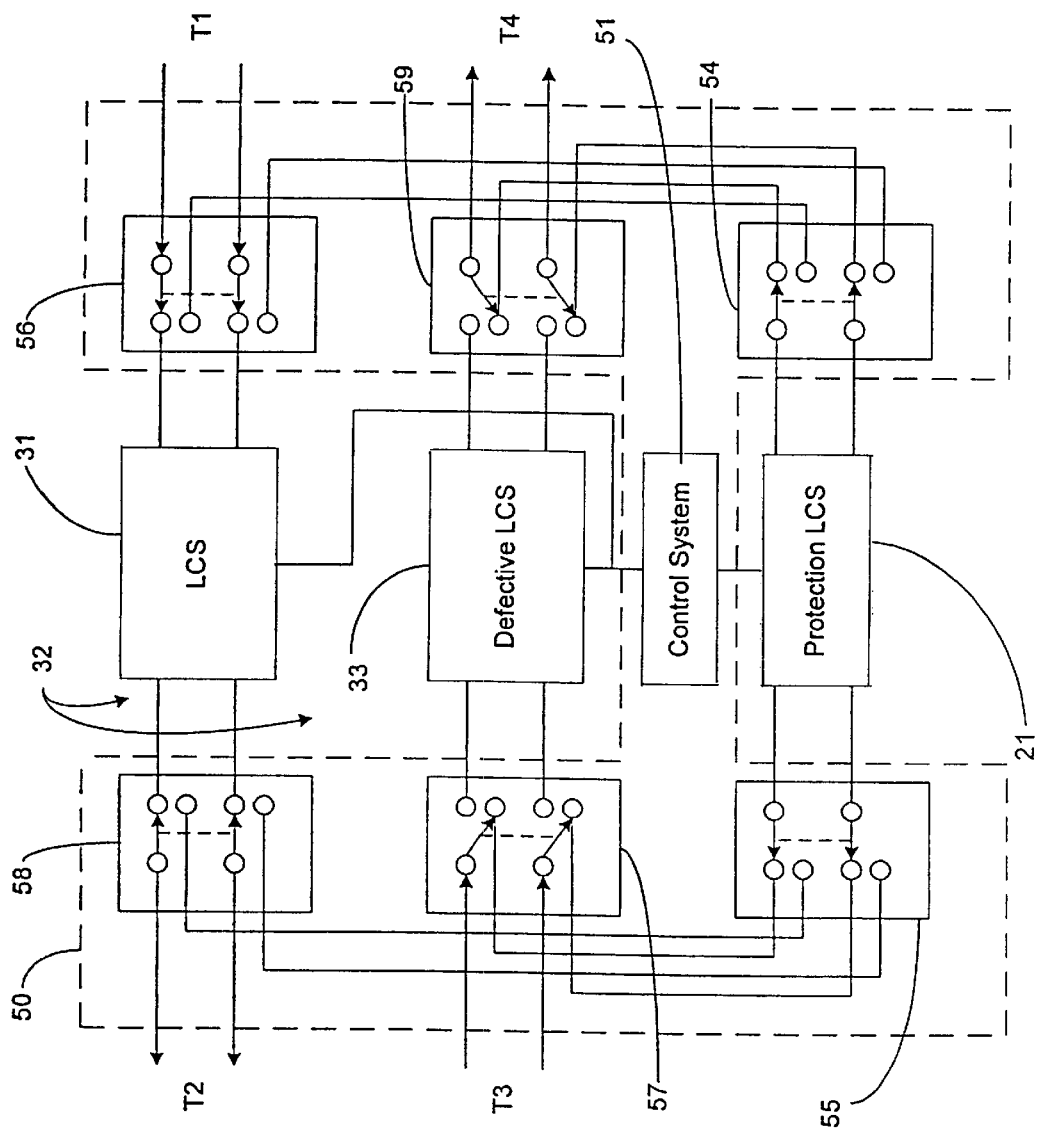
FIG. 8 is a schematic diagram of the optical device protection system of FIG. 6 shown with a defective second LCS.

It will be appreciated that FIG. 7 shows the above switching functions when the LCS 31 for optical signal T1 is defective, whereas FIG. 8 demonstrates switching for a defective T3 LCS 33. Specifically, in FIG. 7 it can be seen that input switch 56 routes optical signal T1 to the protection LCS 21. First protection switch 54 selects defective LCS 31 from the plurality of working LCS's 32. Protection LCS 21 performs the desired switching operation on the optical signal, and second protection switch 55 selects defective LCS 31. Output switch 58 routes the optical signal from protection LCS 21 to the output path of defective LCS 31 as optical signal T2.

FIG. 8 demonstrates the switching operation of optical switch structure 50 when LCS 33 is defective. Thus, input switch 57 routes optical signal T3 from the input path of LCS 33 to protection LCS 21. Second protection LCS 55 selects defective LCS 33 from the plurality of working LCS's 32 based on the error condition of LCS 33. Protection LCS 21 performs the desired switching operation on the optical signal T3 and first protection LCS 54 selects LCS 33 from the plurality of working LCS's 32. Output switch 59 routes the optical signal from the protection LCS 21 to the output path of defective LCS 33 as optical signal T4. Preferably, the input, output, first protection, and second protection switches include 1×2 optical switch pairs to reduce insertion losses.

Figure 10:
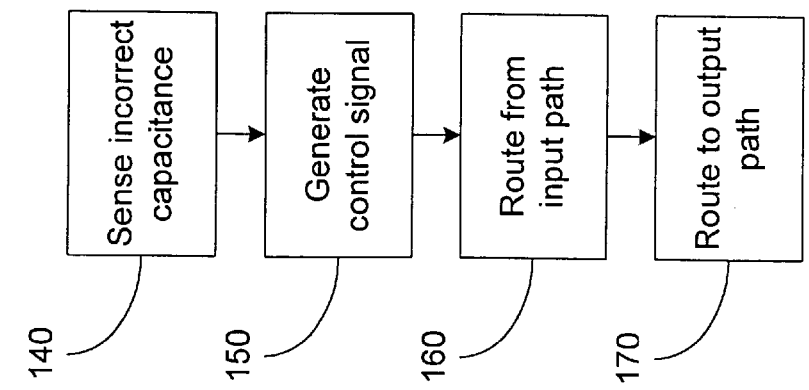
FIG. 10 is a more detailed flowchart of the method shown in FIG. 9.
Figure 9:
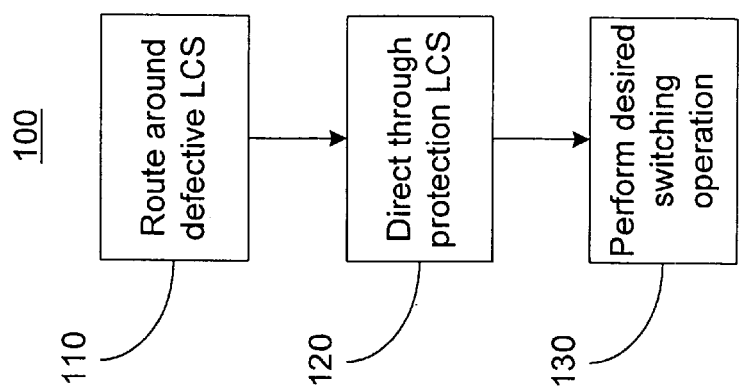
FIG. 9 is a flowchart of a method for protecting a defective LCS in accordance with the present invention.

Turning now to FIG. 9, a method for protecting a defective liquid crystal switch is shown generally at 100. It can be seen that method 100 includes the step 110 of routing an optical signal around an LCS when the defective LCS exhibits an error condition. As discussed above, the error condition is preferably detected by sensing an internal failure such as an incorrect capacitance value of the defective LCS. At step 120 the optical signal is directed through a protection LCS, wherein a desired switching operation is performed at step 130. More specifically, FIG. 10 demonstrates that the incorrect capacitance value is sensed at step 140 and at step 150 the control signal is generated in response to the incorrect capacitance value. Control methods well known in the art can be used to generate the control signal. At step 160 the optical signal is routed from an input path of the defective LCS to the protection LCS based on the control signal. The resulting optical signal is then routed from the protection LCS to an output path of the defective LCS based on the control signal at step 170.

With regard to step 140, it can be appreciated that liquid crystals have an orientational order lacking complete positional order. For example, a nematic liquid crystal cell is a thin layer of nematic liquid crystal placed between two parallel glass plates attached to the plates' surface so that the molecules are parallel to each other. Since electric permativity of the liquid crystal cell depends on orientation of the molecules, the capacitance between the two parallel plates will change as the liquid crystal device is switched. Thus, liquid crystal switching devices can be designed to have a bar state capacitance CBS and a cross-state capacitance CCS. The bar capacitance represents the capacitance across the crystal when the incident light is passed directly through the switch matrix. The cross state capacitance represents the capacitance when the incident light is redirected to a switched location. When one of the switching devices has failed, either by failing to achieve alignment or by contamination of the material, these capacitance values will be incorrect and the switch structure of the present invention can determine that an internal failure has occurred. This capacitance mode of switching control is highly preferred over a signal strength detection approach because attenuation of signal strength can vary due to virtually any component in the network.

The present invention therefore provides a system and method for either dedicated or shared protection of liquid crystal switches. The use of 1×2 switches in the preferred optical switch structure reduces insertion losses and provides a fully optical solution to optical device protection. Furthermore, basing switching control on an incorrect capacitance value of the defective liquid crystal switch allows substantially increased reliability and flexibility.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical device protection system comprising:

an optical switch structure for routing an optical signal around an optical device when the optical device exhibits an error condition, the optical switch structure including a control system for sensing the error condition in the optical switch and generating a control signal in response to the error condition; and a protection optical device for performing a desired operation on the optical signal;

wherein said optical switch structure directs the optical signal through the protection optical device upon detecting the error condition; and wherein the control system senses an incorrect capacitance value associated with the optical device.

2. The protection system of claim 1 wherein the optical device is a liquid crystal switch and the protection optical device is a protection liquid crystal switch, the desired operation including a switching operation.

3. An optical device protection system comprising:

an optical switch structure for routing an optical signal around an optical device when the optical device exhibits an error condition;

a protection optical device for performing a desired operation on the optical signal;

said optical switch structure directing the optical signal through the protection optical device upon detecting the error condition;

wherein the optical device is a liquid crystal switch and the protection optical device is a protection liquid crystal switch, the desired operation including a switching operation;

wherein the optical switch structure includes:

a control system for sensing the error condition in the liquid crystal switch, the control system generating a control signal in response to the error condition;

an input switch configuration for routing the optical signal from an input path of the liquid crystal switch to the protection liquid crystal switch based on the control signal; and an output switch configuration for routing the optical signal from the protection liquid crystal switch to an output path of the liquid crystal switch based on the control signal.

4. The protection system of claim 3 wherein the control system senses an incorrect capacitance value associated with the liquid crystal switch.

5. The protection system of claim 3 wherein the protection system provides dedicated protection to the liquid crystal switch.

6. The protection system of claim 5 wherein the input switch configuration includes a working input switch and the output switch configuration includes a working output switch.

7. The protection system of claim 6 wherein the input and output switches include 1×2 optical switch pairs.

8. The protection system of claim 3 wherein the protection system provides shared protection to the liquid crystal switch, the optical switch structure further including:
   a first protection switch routing the optical signal from the input path of the liquid crystal switch to the protection liquid crystal switch; and
   a second protection switch routing the optical signal from the protection liquid crystal switch to the output path of the liquid crystal switch.

9. The protection system of claim 8 wherein the liquid crystal switch is one of a plurality of working liquid crystal switches, the input switch configuration including a plurality of working input switches disposed along input paths of the plurality of the working liquid crystal switches for selecting the liquid crystal switch from the plurality of working liquid crystal switches based on the control signal from the control system.

10. The protection system of claim 9 wherein the output switch configuration includes a plurality of working output switches disposed along output paths of the plurality of working liquid crystal switches for selecting the liquid crystal switch from the plurality of working liquid crystal switches based on the control signal from the control system.

11. The protection system of claim 10 wherein the input, output, first protection, and second protection switches include 1×2 optical switch pairs.

12. An optical switch structure comprising:
   a control system for sensing an error condition in an optical device, the control system generating a control signal in response to the error condition;
   an input switch configuration for routing the optical signal from an input path of the optical device to a protection optical device based on the control signal, the protection optical device performing a desired operation on the optical signal; and
   an output switch configuration for routing the optical signal from the protection optical device to an output path of the optical device based on the control signal;
   wherein the control system senses an incorrect capacitance value associated with the optical device.

13. Switch structure of claim 12 wherein the optical device is a liquid crystal switch and the protection optical device is a protection liquid crystal switch, the desired operation including a switching operation.

14. The switch structure of claim 13 wherein the protection system provides dedicated protection to the liquid crystal switch.

15. The switch structure of claim 14 wherein the input switch configuration includes a working input switch and the output switch configuration includes a working output switch.

16. The switch structure of claim 15 wherein the input and output switches include 1×2 optical switch pairs.

17. The protection system of claim 13 wherein the protection system provides shared protection to the liquid crystal switch.

18. An optical switch structure comprising:
   a control system for sensing an error condition in an optical device, the control system generating a control signal in response to the error condition;
   an input switch configuration for routing the optical signal from an input path of the optical device to a protection optical device based on the control signal, the protection optical device performing a desired operation on the optical signal; and
   an output switch configuration for routing the optical signal from the protection optical device to an output path of the optical device based on the control signal;
   wherein the optical device is a liquid crystal switch and the protection optical device is a protection liquid crystal switch, the desired operation including a switching operation;
   wherein the protection system provides shared protection to the liquid crystal switch;
   wherein the liquid crystal switch is one of a plurality of working liquid crystal switches, the input switch configuration including:
      a plurality of working input switches disposed in input paths of the plurality of the working liquid crystal switches for selecting the liquid crystal switch from the plurality of working liquid crystal switches based on the control signal from the control system; and
      a first protection switch routing the optical signal from the input path of the liquid crystal switch to the protection liquid crystal switch.

19. The protection system of claim 18 wherein the output switch configuration includes:
   a second protection switch routing the optical signal from the protection liquid crystal switch to the output path of the liquid crystal switch; and
   a plurality of working output switches disposed along output paths of the plurality of working liquid crystal switches for selecting the liquid crystal switch from the plurality of working liquid crystal switches based on the control signal from the control system.

20. The protection system of claim 19 wherein the input, output, first protection, and second protection switches include 1×2 optical switch pairs.

21. A method for protecting a liquid crystal switch, the method comprising the steps of:
   routing an optical signal around the liquid crystal switch when the liquid crystal switch exhibits an error condition;
   directing the optical signal through a protection liquid crystal switch; and
   performing a desired switching operation on the optical signal.

22. The method of claim 21 further including the steps of:
   sensing the fault condition in the liquid crystal switch;
   generating a control signal in response to the error condition;
   routing the optical signal from an input path of the liquid crystal switch to the protection liquid crystal switch based on the control signal; and
   routing the optical signal from the protection liquid crystal switch to an output path of the liquid crystal switch based on the control signal.

23. The method of claim 22 further including the step of sensing an incorrect capacitance value of the liquid crystal switch.

24. The method of claim 23 further including the step of providing dedicated protection to the liquid protection switch.

25. The method of claim 23 further including the step of providing shared protection to the liquid protection switch.

* * * * *